United States Patent [19]
Ricketts

[11] Patent Number: 5,441,016
[45] Date of Patent: Aug. 15, 1995

[54] GIRAFFE HANDLING CHUTE

[76] Inventor: Tod Ricketts, 2330 E. Cherryvale, Springfield, Mo. 65804

[21] Appl. No.: 183,827

[22] Filed: Jan. 21, 1994

Related U.S. Application Data

[63] Continuation-in-part of Ser. No. 983,409, Nov. 30, 1992, Pat. No. 5,282,441.

[51] Int. Cl.⁶ ............................................ A61D 3/00
[52] U.S. Cl. ................................... 119/723; 119/752
[58] Field of Search ...................... 119/723, 751, 752

[56] References Cited

U.S. PATENT DOCUMENTS

| | | | |
|---|---|---|---|
| 2,396,928 | 3/1946 | Parsons | 119/733 |
| 2,528,664 | 11/1950 | Niece | 119/724 |
| 2,737,153 | 3/1956 | Dupont et al. | 119/723 |
| 2,804,046 | 8/1957 | Turner | 119/736 |
| 3,590,784 | 7/1971 | Fly . | |
| 3,941,095 | 3/1976 | Hamilton et al. | 119/723 |
| 3,960,113 | 6/1976 | Kratky | 119/723 |
| 4,162,685 | 7/1979 | Knappenberger | 119/723 |
| 4,195,595 | 4/1980 | Shimonovich | 119/723 |
| 4,195,595 | 4/1980 | Shimonovich | 119/724 |
| 4,214,555 | 7/1980 | Sawby | 119/723 |
| 4,324,206 | 4/1982 | Pearson | 119/752 |
| 4,567,854 | 2/1986 | Burns | 119/723 |
| 5,035,204 | 7/1991 | Knoss | 119/752 |

*Primary Examiner*—Robert P. Swiatek
*Attorney, Agent, or Firm*—Litman, McMahon and Brown

[57] ABSTRACT

A giraffe handling chute designed to confine and secure a giraffe for veterinary and hygienic care includes a confining structure with a frame connecting a fixed wall assembly and an opposing, movable wall assembly. The movable wall assembly is selectively movable toward and away from the fixed wall assembly along the frame to securely hold the giraffe. The confining structure is adjustable vertically via telescoping members at the bottom and top of the frame, and the entire confining structure is rotatable relative to a support assembly such that the confined giraffe can be rotated to a position in which it is lying on its side. Other features include pivoting leg restraints and torso support flaps and a removable neck restraint assembly and neck support assembly for immobilizing and supporting the neck of a confined giraffe during sedation and/or rotation.

44 Claims, 8 Drawing Sheets

GIRAFFE HANDLING CHUTE

CROSS REFERENCE TO RELATED APPLICATIONS

This application is a continuation-in-part of application Ser. No. 07/983,409 for LARGE ANIMAL HANDLING CHUTE, filed Nov. 30, 1992, and now U.S. Pat. No. 5,282,441.

BACKGROUND OF THE INVENTION

1. Field of the Invention

This invention is directed to a handling chute for a giraffe or the like and more particularly to a handling chute which is adjustable such that a giraffe of any size can be securely held with its torso, legs and neck safely and adequately supported. The chute is also rotatable so that the securely held giraffe can be selectively rotated to a position in which it is lying on its side.

2. Description of the Related Art

In situations in which large animals, such as giraffes or the like, require medical attention, including inoculations, hygienic care or other close quarter handling, an attending handler or veterinarian is in constant danger of serious injury by the animal, either intentional or inadvertent. This is particularly true if the attended animal is unrestrained. Of even greater concern with regard to giraffes is the serious threat of injury or death to the animal if it is mishandled. Due to the length of a giraffe's legs and neck, handling of the animals is unusually difficult. Often when the animals are sedated, unintended pressure on their necks can result in death by suffocation as their ability to breath is restricted. Even improper positioning of an animal's neck while sedated can cause death. For these reasons, giraffes are one of the most difficult animals to safely restrain while providing veterinary attention, even including simple hygiene and other routine measures such as hoof maintenance.

Numerous attempts have been made to create a safe and effective handling chute for large animal veterinary and hygienic care. However, most such prior art attempts have been directed at cattle, horses and other domestic animals.

In a typical prior art device, a horse or cow is driven into a confining chute with two walls in which one or both walls are movable. Often a head gate is provided at one end to immobilize the animal's head. The movable wall(s) are then moved inwardly toward the confined animal, gripping it in a vise-like arrangement. Some movable wall systems have even been made large enough to handle elephants or other large animals. Generally such systems have been simple stalls with one movable wall in which the animal is maintained in an upright position.

In some prior art devices for cattle or horses, the entire confining chute is then made pivotable about an axis which allows the animal to be rotated for enhanced access to the feet and legs, for example.

Such prior art handling chutes have generally not been suitable for giraffes, for a number of reasons. The dimensions of a giraffe's neck and legs are simply unique, thus making it difficult if not impossible to adapt an existing structure to adequately secure them. In addition, as earlier stated, the threat that improperly handled or restrained giraffes can get their necks into a contorted position in which they can be severely or fatally injured is a unique problem as well. Ordinary head gates are not effective in holding a giraffe's head, which is substantially elevated by their long neck, and the height of a giraffe's legs tends to place their torso above the constraining mechanisms of existing handling structures. Finally, giraffes are inherently wild animals, making ordinary restraining devices, into which domesticated animals such as horses and cattle would readily enter, unsuitable for giraffes who are reluctant to subject themselves to such confinement. In summary, none of the known prior art restraining chutes is designed for, nor are they readily adaptable for use with a giraffe.

It is clear, then, that a real need exists for a handling chute designed to provide a handler or veterinarian safe and convenient access to all portions of a giraffe's anatomy. Such a chute must be extremely strong and durable, yet flexible in it's operation, should provide for secure restraint, and should be readily adjustable to accommodate animals of varying sizes. Furthermore, the special needs of a giraffe require that any safe handling chute provide adequate neck support without unduly constricting the neck. A suitable chute should also be capable of safely rotating the giraffe to a position in which its feet are readily accessible, should protect the handlers from damage by a restrained giraffe, and, preferably, should provide for ready access to all parts of the restrained giraffe's anatomy.

SUMMARY OF THE INVENTION

In the practice of the present invention, a giraffe handling chute includes a support assembly including three spaced support beams which are interconnected in an H configuration. Attached to the top of and near respective ends of the cross support beam are a pair of vertical telescoping support sleeves. Each vertical sleeve ends in a respective upper pivot mount and a fixed wall assembly is pivotally attached to the pair of vertical support beams via the pivot mounts. A vertically oriented hydraulic cylinder is positioned inside of each telescoping vertical support sleeve, and the fixed wall assembly can be selectively raised relative to the cross support beam by extending the pair of vertical hydraulic cylinders. An additional pair of angled hydraulic cylinders are connected between a respective pair of short horizontal supports attached to the front of the telescoping sleeves and a respective pair of clevises on the fixed wall assembly.

A moving wall assembly is slidably connected to a frame which is, in turn, connected to the fixed wall assembly to form a confining chute. The moving wall assembly is movable toward and away from the fixed wall assembly to vary the spacing therebetween. The topmost portion of the movable wall assembly, the frame, and the fixed wall assembly are collectively adjustable vertically via telescoping supports and an additional pair of hydraulic cylinders. A pair of end gates are pivotally attached to respective movable hinges located near each end of the fixed wall assembly. Each gate is adjustable in width, can be selectively opened and shut via a retractable cylinder, and each gate can be adjusted longitudinally relative to the fixed wall assembly by moving the hinge via a motorized lead screw. The entire confining chute is selectively rotatable relative to the horizontal support assembly by extending the angled hydraulic cylinder pair so that a confined giraffe can be conveniently rotated to lie on its side, providing access to its lower extremities. Additional features include a pair of pivotable leg restraints, a pair of pivotable torso support flaps, and a removable and adjustable neck restraint system and neck support system. In order to minimize the risk of damage to a restrained giraffe's neck, pressure sensors can be provided within the neck support system with a connected switch to restrict the amount of pressure on the giraffe's neck which can be applied by the neck restraint system.

OBJECTS AND ADVANTAGES OF THE INVENTION

The principle objects and advantages of the present invention include: to provide a handling chute for a giraffe; to provide such a handling chute which can safely confine a giraffe to permit close quarter handling thereof and/or safe local or general anesthesia of a confined giraffe; to provide such a chute which permits ready access to all portions of a confined giraffe's anatomy; to provide such a chute which includes a confining space comprised of a fixed wall assembly and a movable wall assembly with a connecting frame, with the movable wall assembly being selectively movable toward and away from the fixed wall assembly along the connecting frame; to provide such a chute in which the confining space is adjustable vertically to accommodate the long legs and neck areas of a giraffe; to provide such a chute in which the confining space including the fixed and movable wall assemblies is rotatable as a unit to permit access to the giraffe's lower extremities; to provide such a chute in which a removable neck support system provides safe and secure support for a confined giraffe's neck; to provide such a chute in which one or more torso support flaps can be extended from the fixed wall assembly to provide additional support for a confined giraffe; to provide such a chute in which a pair of end gates are selectively opened and closed via a respective pair of hydraulic cylinders, are adjustable longitudinally relative to the frame via a respective pair of motorized lead screws, and which gates are telescopically adjustable to completely close off the ends of the confining space; to provide such a chute in which a pair of leg restraining pads are pivotably attached to the movable wall assembly, with the leg restraining pads being extendable to confine the giraffe's legs between the pads and respective ones of the end gates; and to provide such a handling chute which is durable, safe and convenient to use and which is particularly well suited for its intended use.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail the reference numeral 1 generally designates a confinement structure of a giraffe handling chute with a fixed wall assembly 2 and a movable confinement wall assembly 3. The fixed wall assembly 2 includes a pair of fixed upright frame members 4 and 5, a longitudinal horizontal top frame member 11 and a longitudinal horizontal bottom frame member 12. The top frame member 11 is connected to a pair of transverse top frame members 13 and 14 and the bottom longitudinal frame member 12 is connected to a pair of transverse bottom frame members 15 and 16. An opposite fixed longitudinal top frame member 21 is connected between the transverse top frame members 13 and 14 and between one end of a pair of fixed upright frame members 22 and 23, which are connected at the bottom end to respective ones of the transverse bottom frame members 15 and 16.

II. Movable Wall Assembly

The movable wall assembly 3 includes a pair of outer movable upright frame members 24 and 25, with the outer frame member 24 connected between respective top and bottom rectangular sleeves 31 and 32, and the outer frame member 25 connected between respective top and bottom rectangular sleeves 33 and 34. Each of the rectangular sleeves 31-34 is slidable relative to the transverse frame member 13-16, respectively, which it encircles. Connected between the movable upright frame members 24 and 25 are a pair of movable upper and lower longitudinal frame members 35 and 36, respectively, and an inner pair of upright frame members 41 and 42 are, in turn, connected between the longitudinal frame members 35 and 36. The inner frame members 41 and 42 support a framework comprising an upper horizontal support 43, a number of intermediate horizontal supports 44, a lower center upright support 45 and a number of upper upright supports 46. Attached to the upper upright supports 46 are one or more pairs of hinges 51, each pair of which is attached to a door 52 which is pivotable relative to the respective upright support 46. Nearer the bottom of the movable wall assembly 3 are a number of kick panels 53, each of which is positioned between two of the horizontal supports 44 and/or 45. Each kick panel 53 is removable, as shown in FIG. 2.

Figure 1:
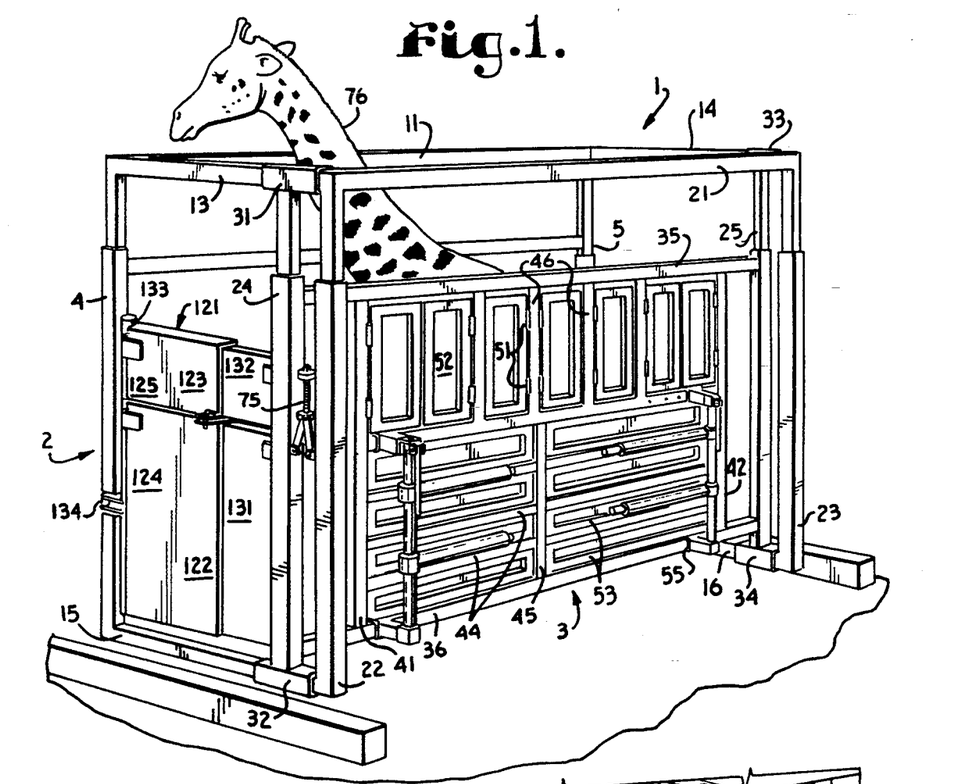
FIG. 1 is a perspective view of a giraffe handling chute in accordance with the invention, illustrating the movable wall assembly.
Figures 2, 3:
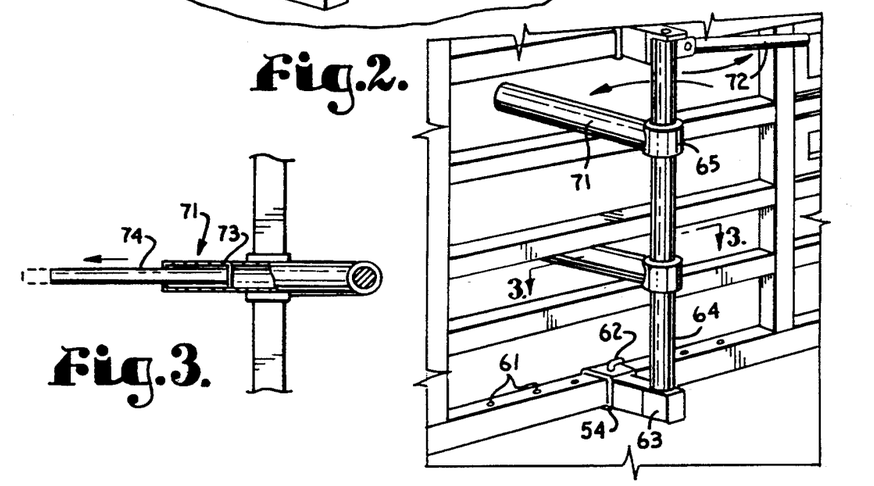
FIG. 2 is an enlarged, fragmentary perspective view of one of the leg restraints being pivoted into a restraining position.
FIG. 3 is an enlarged, cross-sectional view of one of the leg restraint arms, illustrating the telescoping structure of the arm.

As shown in FIGS. 1 and 2, two pair of slidable rectangular sleeves 54 and 55 are attached to the upper horizontal support 44 and the lower movable longitudinal frame member 36, respectively. Both the upper horizontal support 44 and the frame member 36 have a number of bores 61 drilled through the top to accommodate a set pin 62 which is inserted through the top of each of the rectangular sleeves 54 and 55. Thus each of the sleeves 54 and 55 is adjustable along a portion of the respective support 44 or frame member 36, but can be locked in place via the pins 62 and bores 61. The adjustability of the sleeves 54 and 55 allow the leg restraints 71 to be used with different sized animals. Connected to and extending outward from each of the sleeves 54 and 55 is a horizontal extension 63. A round support rod 64 is pivotably connected between the extensions 63 on each side of the movable wall assembly 3. A pair of collars 65 are attached to each rod 64 and a padded leg restraint 71 is connected to each collar 65. A handle 72 is connected near the top of each support rod 64, which handle 72 can be used to pivot the respective support rod 64, along with the attached leg restraints 71 into the confining structure 1 to restrain a confined giraffe's legs. FIG. 3 illustrates one of the leg restraints 71, which includes an outer sleeve 73 with an inner, telescoping rod 74 slidably mounted therein. Each leg restraint 71 is thus adjustable to accommodate for varying widths of the confining structure 1. The telescoping rod 74 fits snugly within the sleeve 73 such that it remains in position without keepers or other restraints once the length of the restraint 71 is adjusted.

Figure 6:
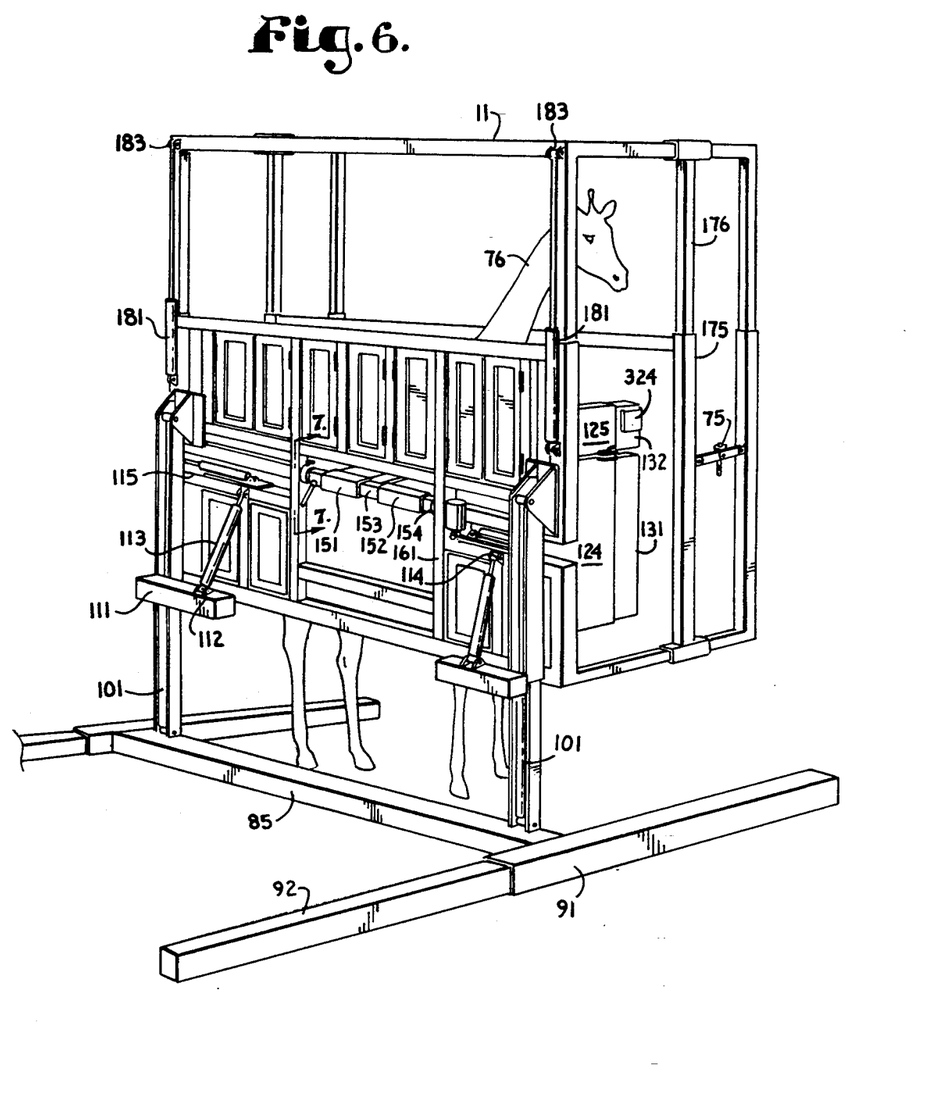
FIG. 6 is a perspective view of the handling chute with the bottommost portion of the confining structure raised via the telescoping support sleeves, and with the topmost portion of the chute extended via upper hydraulic extension cylinders.
Figure 7:
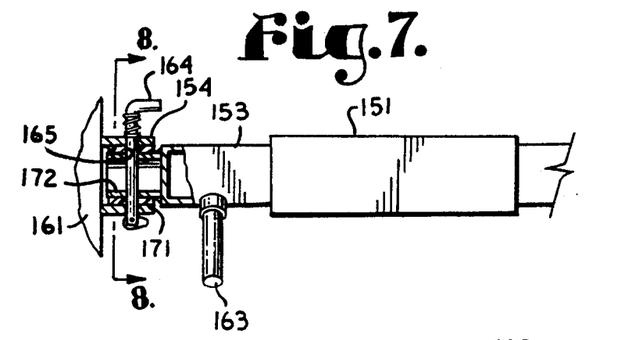
FIG. 7 is an enlarged cross-sectional view of a torso support flap, taken along line 7—7 of FIG. 6, and with portions broken away to illustrate the interior construction of its rotatable collar and locking pin.

A jackscrew 75 is attached between fixed upright frame member 22 and upright frame member 24 of the movable wall assembly 3. While only one jackscrew 75 is shown, it should be pointed out that two jackscrews 75 could be used, one on either side of the movable wall assembly 3. Referring to FIGS. 1 and 6, the jackscrew 75 is shown in a retracted and an extended position, respectively. In the retracted position shown in FIG. 1, the movable wall assembly 3 is spread as far as possible from the fixed wall assembly 2. Once a giraffe 76 is confined in the confining structure 1, the jackscrews 75 are extended to a position in which the giraffe is effectively wedged between the movable wall assembly 3 and the fixed wall assembly 2.

III. Chute Support, Fixed Wall Assembly and Chute Rotation

Figures 4, 5, 21:
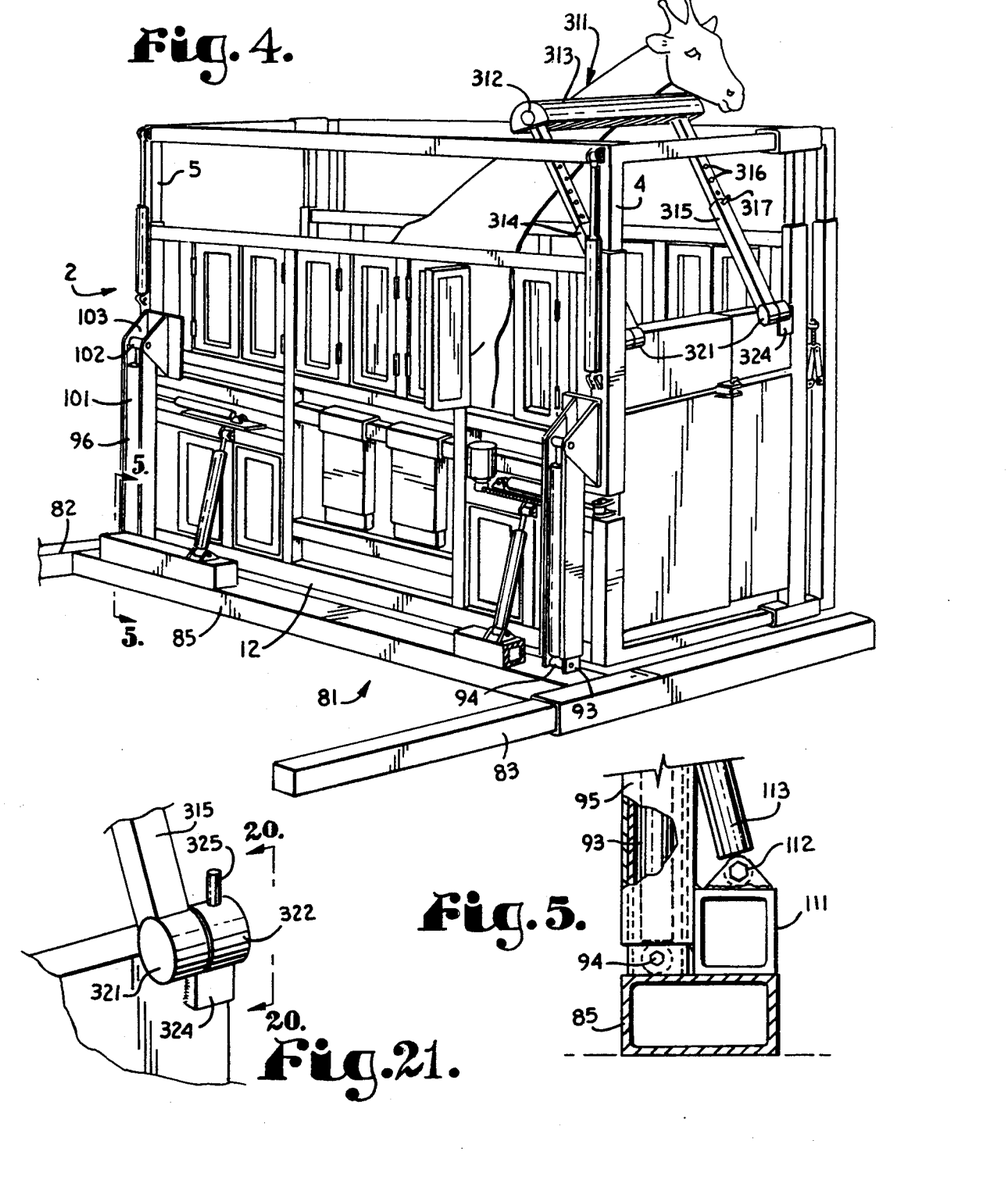
FIG. 4 is a perspective view of the giraffe handling chute, illustrating the fixed wall assembly and the support assembly and with a neck support assembly engaging the bottom side of the giraffe's neck.
FIG. 5 is an enlarged cross-sectional view of a vertical telescoping support sleeve, taken along line 5—5 of FIG. 4, with portions broken away to illustrate the interior construction thereof, and of the bottom portion of a rotation cylinder attached to a rotation support beam.
FIG. 21 is an enlarged, fragmentary perspective view of the a portion of the neck support assembly, illustrating the pivotable attachment of one of the support arms to a fixed collar.

FIGS. 4-6 illustrate the fixed wall assembly 2 attached to a chute support assembly 81. The support assembly 81 includes a pair of relatively large support beams 82 and 83 which extend transversely across the confining structure 1 and which rest on a support surface 84, such as a building floor or concrete pad. Extending between the beams 82 and 83 is a third support beam 85. Each of the support beams 82 and 83 can include a fixed outer sleeve 91 and a telescoping inner sleeve 92 which function to adjust the overall length of the beams 82 and 83 to allow the handling chute to be more easily transported, as is shown in FIG. 6. A pair of fixed angle members 93 are attached, one near either end of the support beam 85. Each of the angle members 93 includes a corresponding clevis 94 near the bottom. The angle members 93 are fixed with respect to the beam 85 and are surrounded by an outer rectangular telescoping sleeve 95 which has a lip portion 96 which overlaps the front of the angle members 93. Each telescoping sleeve 95 is movable vertically relative to the corresponding angle member 93, and includes a hydraulic elevating cylinder 101 which extends between one of the clevises 94 and a clevis 102 attached to a triangular support 103. Each triangular support 103 is secured to the fixed wall assembly 2 by attachment to an upright frame member 4 or 5.

Referring to FIG. 6, when the hydraulic cylinders 101 are extended, the confining structure 1 is elevated relative to the support assembly 81 to better accommodate the long legs of a confined giraffe 76 or to raise its legs off of the support surface 84 in preparation for rotation.

Figure 22:
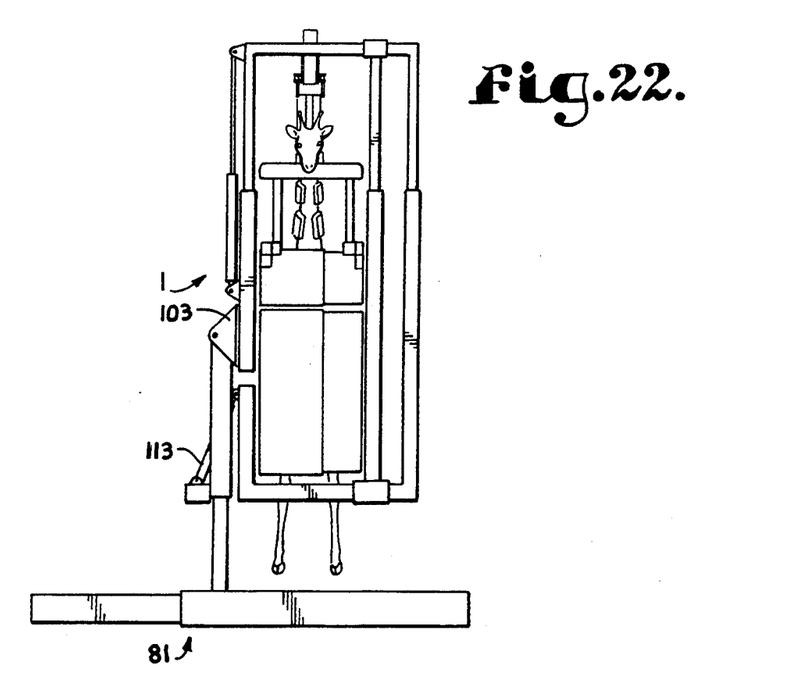
FIG. 22 is a partially schematic, end elevational view of the giraffe handling chute, with a giraffe secured therein, with the confining structure elevated off of the support surface, and with its neck secured by the neck support and neck restraint assemblies.
Figure 23:
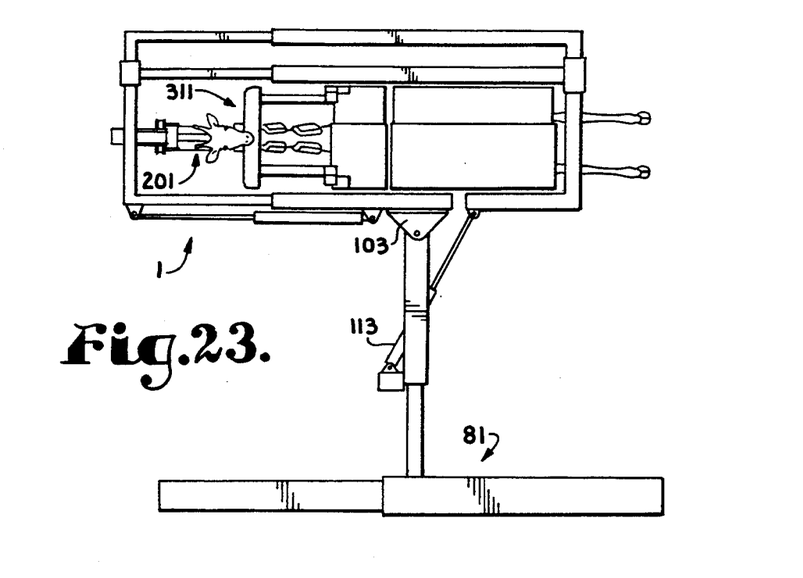
FIG. 23 is another partially schematic, end elevational view of the giraffe handling chute, with the giraffe secured therein, and with the confining structure rotated to a position in which the giraffe is lying on its side.

Rigidly attached to the front of each telescoping sleeve 95 is a block 111 upon which is mounted a clevis 112. A rotation hydraulic cylinder 113 is attached at one end to each clevis 112 and, at the other end, to a clevis 114 which is fixedly attached to a spar 115 in the fixed wall assembly 2. Referring to FIGS. 22 and 23, the rotation of the confining structure 1 is shown in partial schematic form. The rotation cylinders 113 are extended, which causes the bottom of the fixed wall assembly to be urged outward. This causes the entire confining structure 1, with the confined giraffe 76, to be rotated about the clevises 102 attached to the triangular supports 103.

IV. Adjustable Doors, Torso Support Flaps and Upper Extension

The confining structure 1 is equipped with a door 121 at either end. Each door 121 includes a lower door 122 and upper door 123. Each of the lower and upper doors are of a two part construction with an outer shell 124 and 125, respectively, and a telescoping inner shell 131 and 132, respectively. As the jackscrews 75 are extended, the upper and lower wall inner shells 131 and 132 are pushed into the respective outer shells 124 and 125, thus allowing the doors 121 to accommodate the reduced dimension between the movable wall assembly 3 and the fixed wall assembly 2.

Figures 10, 11, 12, 20:
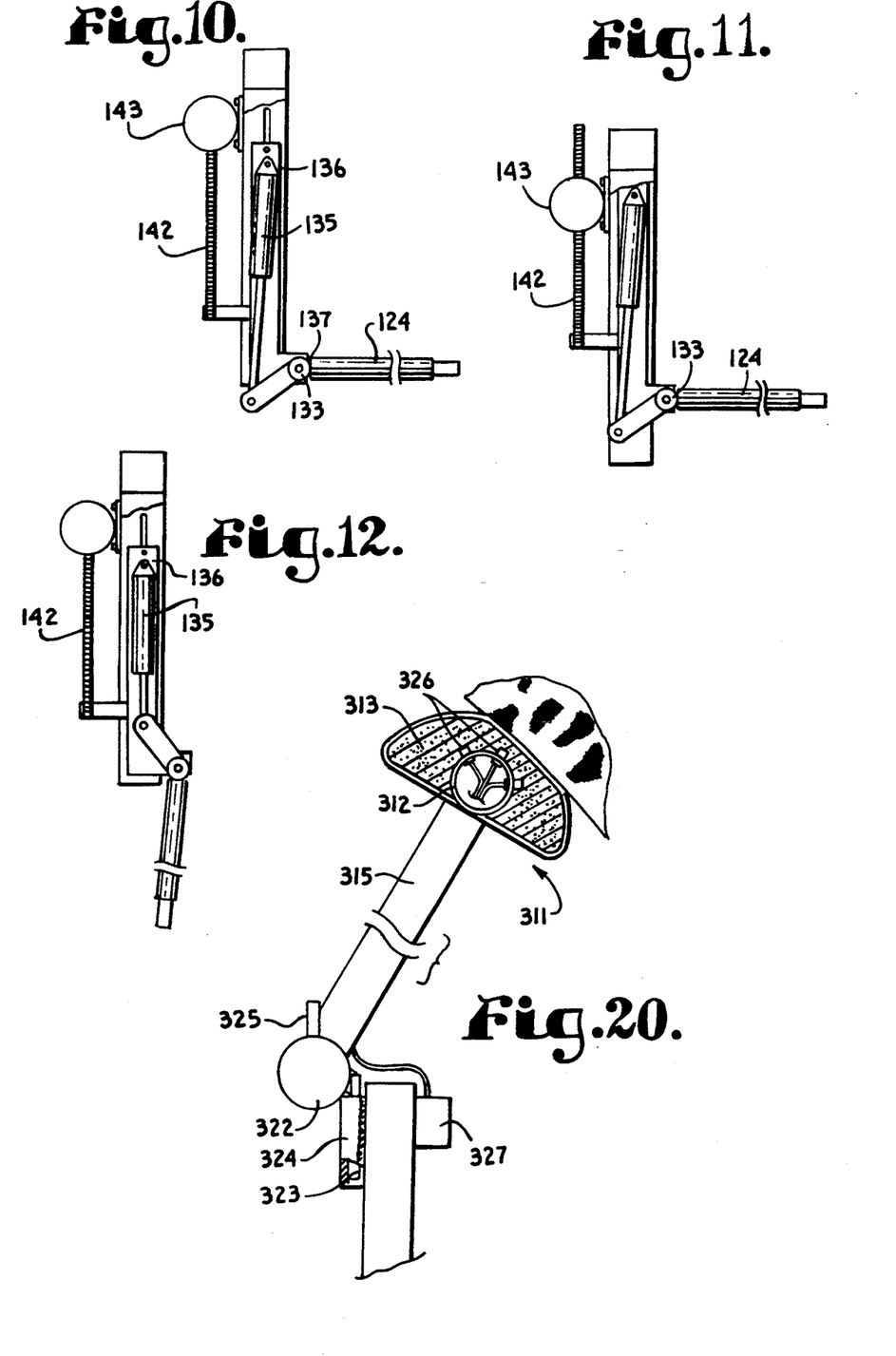
FIG. 10 is an enlarged, cross-sectional view of a gate operating assembly, taken along line 10—10 of FIG. 9, with the gate operating cylinder extended, thus closing the gate, and with the motorized lead screw in the extended position.
FIG. 11 is a reduced, cross-sectional view of the gate operating assembly, taken along line 10—10 of FIG. 9, with the gate operating cylinder extended, thus closing the gate, and with the motorized lead screw pulling the gate operating cylinder, the gate hinge and the gate itself inward.
FIG. 12 is a reduced, cross-sectional view of the gate operating assembly, taken along line 10—10 of FIG. 9, with the gate operating cylinder retracted, thus opening the gate, and with the motorized lead screw in the extended position.
FIG. 20 is an enlarged, fragmentary and partially schematic view of the neck support assembly, with portions of a pad broken away to illustrate a pressure sensor contained therein and with portions of a securing pocket broken away to illustrate the attachment of the neck support assembly to a gate.

The upper and lower outer shells 124 and 125, respectively, are attached to an upright door support 133, which, in turn, is attached to a movable hinge 134. Referring to FIGS. 4 and 9-12, the hinge 134 is pivotally attached to one end of a door opening and closing hydraulic cylinder 135, the other end of which is attached to a movable plate 136. The plate 136 includes an aperture 137 through which the upright door support 133 extends such that the cylinder 135, when retracted, as shown in FIG. 12, pulls the hinge 134 inward, causing a bell crank action which pivots the door 121 about the plate aperture 137 to an open position. Bearings (not shown) can be installed within the aperture 137 to facilitate door movement. Of course, conversely, when the cylinder 35 is extended, as shown in FIGS. 10 and 11, the door 121 pivots to a closed position.

The movable plate 136 extends through a slot 141 in the fixed wall assembly 2 and is attached to a lead screw 142 which is movable longitudinally relative to a housing 143 via the action of a reversible motor 144. Thus, depending upon the direction of the motor 144, the movable plate 136, with the cylinder 135 and the door 121 attached, is movable in and out relative to the ends of the confining structure 1 along the slot 141 to accommodate varying body lengths of giraffes 76.

Figure 8:
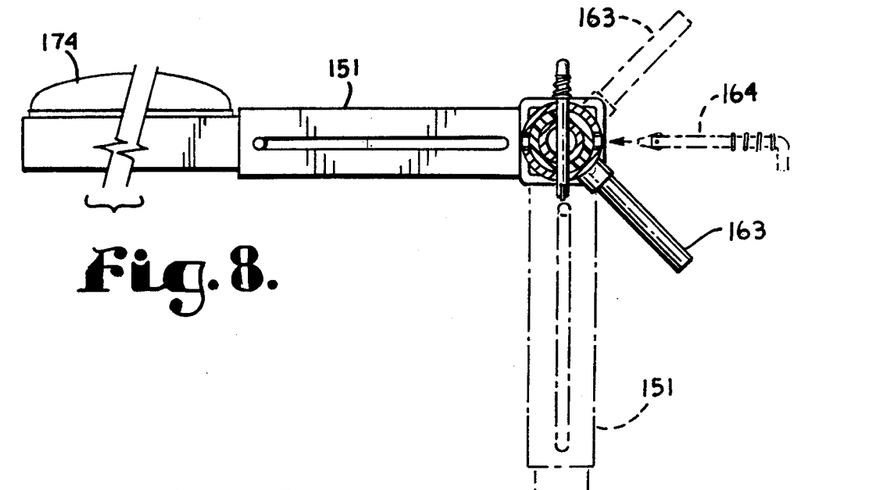
FIG. 8 is another enlarged cross-sectional view of the torso support flap, taken along line 8—8 of FIG. 7, and with the flap illustrated in solid lines in an extended, horizontal position, and in phantom lines in a retracted, vertical position, and with an inflatable pad placed on the telescoped flap.
Figure 9:
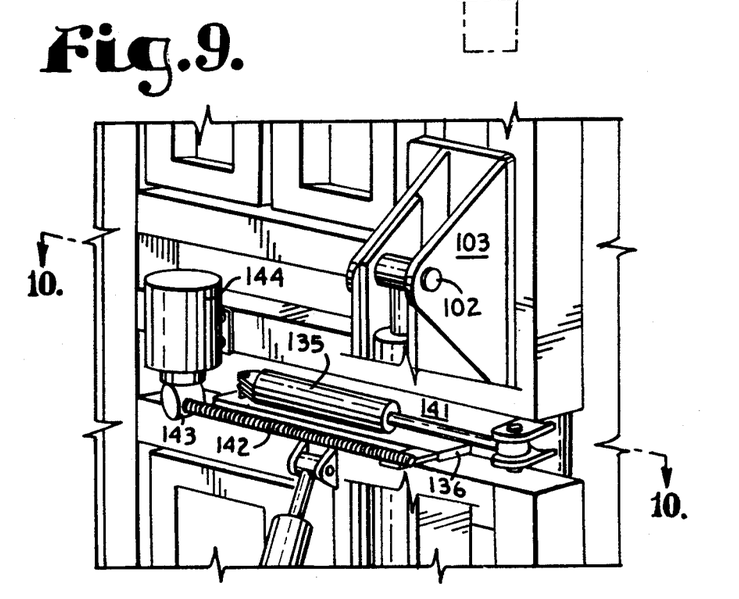
FIG. 9 is an enlarged, fragmentary view of a gate operating assembly including a gate hinge, gate operating cylinder, and motorized lead screw in the giraffe handling chute.

Referring to FIGS. 4 and 6-8, a pair of torso support flaps 151 and 152 are attached to a support bar 153. The bar 153 is rotatable relative to a pair of fixed collars 154 which are, in turn, attached to respective upright members 161 in the fixed wall assembly 2. A handle 163 is attached to the support bar 153, and a spring loaded locking pin 164 is insertable in a bore 165 which extends through the collar 154, a bearing 171 and a circular extension 172 of the support bar 153. A second bore 173 extends through the extension 172 at right angles to the bore 165. By removing the locking pin 164, rotating the bar 153 90 degrees via the handle 163, and reinserting the pin 164, the flaps 151 and 152 are pivotable between a retracted down position, as shown in FIG. 8 in phantom lines, and an extended, horizontal position, as shown in solid lines in FIG. 8. An optional pad 174, which may be a removable air inflatable bag, may be placed upon the extended and telescoped torso flaps 151 and 152 to protect the giraffe 76 during confinement and rotation. The fixed wall assembly 2 also has a number of hinged doors 52 which can be opened to allow access to a confined giraffe.

Referring again to FIG. 6, each of the upright frame members 4, 5, and 22-25 has an outer sleeve 175 and a telescoping inner sleeve 176. A pair of upper extension cylinders 181 are attached between clevises 182 on upright members 4 and 5 of the fixed wall assembly 2 and clevises 183 on the horizontal top frame member 11. By extending the cylinders 181, all of the upright frame members 4, 5 and 22-25 are telescoped upward, thus extending the topmost portion of the confining structure 1 to accommodate the extremely long necks of confined giraffes 76, and to provide adequate support for a removable neck restraint assembly 201, to be described below.

V. Neck Restraint and Support Assemblies

Figures 13, 17, 19:
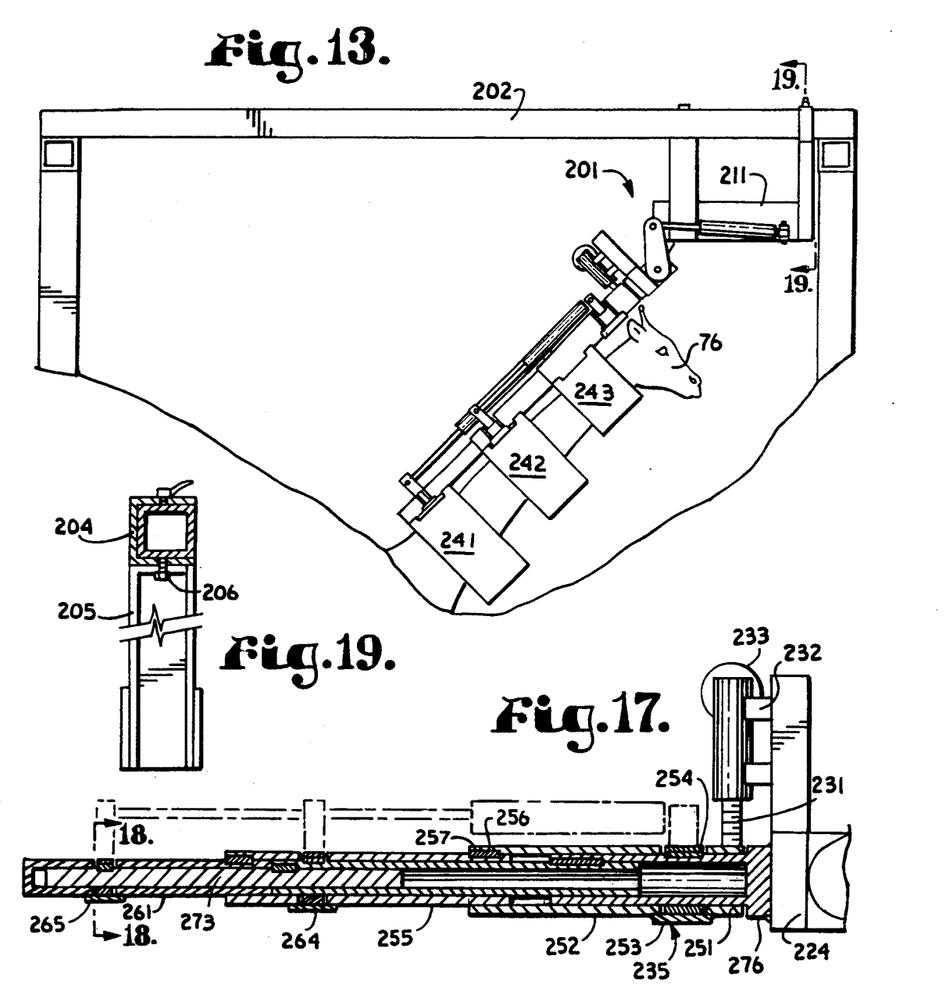
FIG. 13 is a fragmentary view of a giraffe positioned in a handling chute, with portions of the chute broken away to illustrate a neck restraint assembly in supporting position above the giraffe's neck.
FIG. 17 is a cross-sectional view of the neck flap assembly, taken along line 17—17 of FIG. 14, illustrating the interior construction of one of the flap assemblies, and with a pair of extension cylinders illustrated in phantom lines.
FIG. 19 is an enlarged, cross-sectional view of a portion of the neck restraint assembly.

Referring to FIGS. 13-19, the neck restraint assembly 201 is shown attached to a central longitudinal support member 202 which extends atop the length of the confining structure 1. A slot 203 through the support member 202 from the top to the bottom thereof extends almost the entire length of the member 202. The neck restraint assembly 201 includes a C clamp 204 which is pivotably attached to a vertical post 205 via a bolt 206 (FIG. 19). The post 205 is attached to one end of a horizontal support 211, which support 211 is encircled near the opposite end by a rectangular support strap 212. A bolt 213 extends through the top of the strap 212 and through the slot 203. A set collar 214 is attached to the bolt 213 above the slot 203 to hold the bolt 213 and the attached strap 212 in place against the support member 202.

A fixed collar 215 is attached to the bottom and near the end of the horizontal support 211 and a shaft 221 (FIG. 16) extends through the collar 215 and is rotatable relative thereto. One end of a pair of support plates 222 and 223 are attached to the shaft 221 such that they rotate with the shaft 221. The support plates 222 and 223 are attached at the other end to respective sides of a T shaped support plate 224. A pair of bushings 225 can be provided to facilitate rotation of the shaft 221 and plates 222 and 223 relative to each other. A motorized lead screw 231 is attached to the T support 224 via straps 232 and the lead screw 231 includes a reversible motor 233 which is operative to turn the threaded lead screw 231 in either direction. The lead screw 231, in turn, rotates a pair of telescoping flap assemblies 235 and 236 in respective opposite directions. Three neck engaging flaps 241-243 are attached to the flap assembly 235 and three matching neck flaps 244-246 are attached to the flap assembly 236. Each flap 241-246 is equipped with a pad 247 to protect the giraffe's neck.

Figure 18:
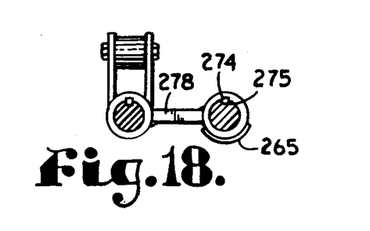
FIG. 18 is a cross-sectional view of the neck flap assembly, taken along line 18—18 of FIG. 17, illustrating a cross section of both flap assemblies.

Referring to FIG. 17, the flap assembly 235 is shown in cross section to illustrate the construction thereof, it being understood that the flap assembly 236 is identical in construction except for the placement of stationary components. The flap assembly 235 includes a rotating collar 251 which attached to an outer sleeve 252 via a rigid strap 253 which bridges a non-rotating collar 254. The outer sleeve 252 thus is constrained to rotate with the collar 251. An intermediate sleeve 255 is connected to and is extendable relative to the outer sleeve 252. A keyway 256 is placed in the outer sleeve 252 and a mating key 257 is attached to the intermediate sleeve 255. The intermediate sleeve 255 is thus constrained to rotate with the outer sleeve 252. In a similar fashion, a terminal sleeve 261 is attached to and is extendable relative to the intermediate sleeve 255 and is rotatable therewith due to a respective key 262 and keyway 263. Both the intermediate sleeve 255 and the terminal sleeve 261 have two parts separated by non-rotatable collars 264 and 265, respectively. A rigid strap 271 interconnects the two separate parts of the sleeve 255 and a rigid strap 272 interconnects the two parts of the terminal sleeve 261 such that all sleeve parts rotate together. The non-rotating collars 264,265 and 254 are connected to an internal telescoping sleeve 273 via keys 274 and keyways 275 (FIG. 18). The sleeve 273 is affixed to a rigid circular plate 276 which is welded to the T support 224.

Referring again to FIG. 14, the fixed collar 265 is attached to a matching fixed collar 281 and the fixed collar 264 is attached to a matching fixed collar 282 in the flap assembly 236. An additional fixed collar 283 is included in the flap assembly 236. A hydraulic cylinder 284 is attached at either end to a pair of clevises 285 and 286 attached to the fixed collars 254 and 264, respectively, in the flap assembly 235. Similarly, a hydraulic cylinder 291 is attached at either end to a pair of clevises 292 and 293 attached to the fixed collars 281 and 283, respectively, in the flap assembly 236. As the hydraulic cylinder 284 is extended, the intermediate sleeve 255 in the flap assembly 235 is telescoped out relative to the outer sleeve 252. Since the flap assemblies 235 and 236 are interconnected, a corresponding extension simultaneously occurs in flap assembly 236. Likewise, as the hydraulic cylinder 291 is extended, the terminal sleeve 261 in flap assembly 235 is extended relative to the intermediate sleeve 255, and corresponding components in the flap assembly 236 are telescoped as well. The entire neck restraint assembly 201 is thus adjustable in length to accommodate different sizes of animals.

Figures 14, 15, 16:
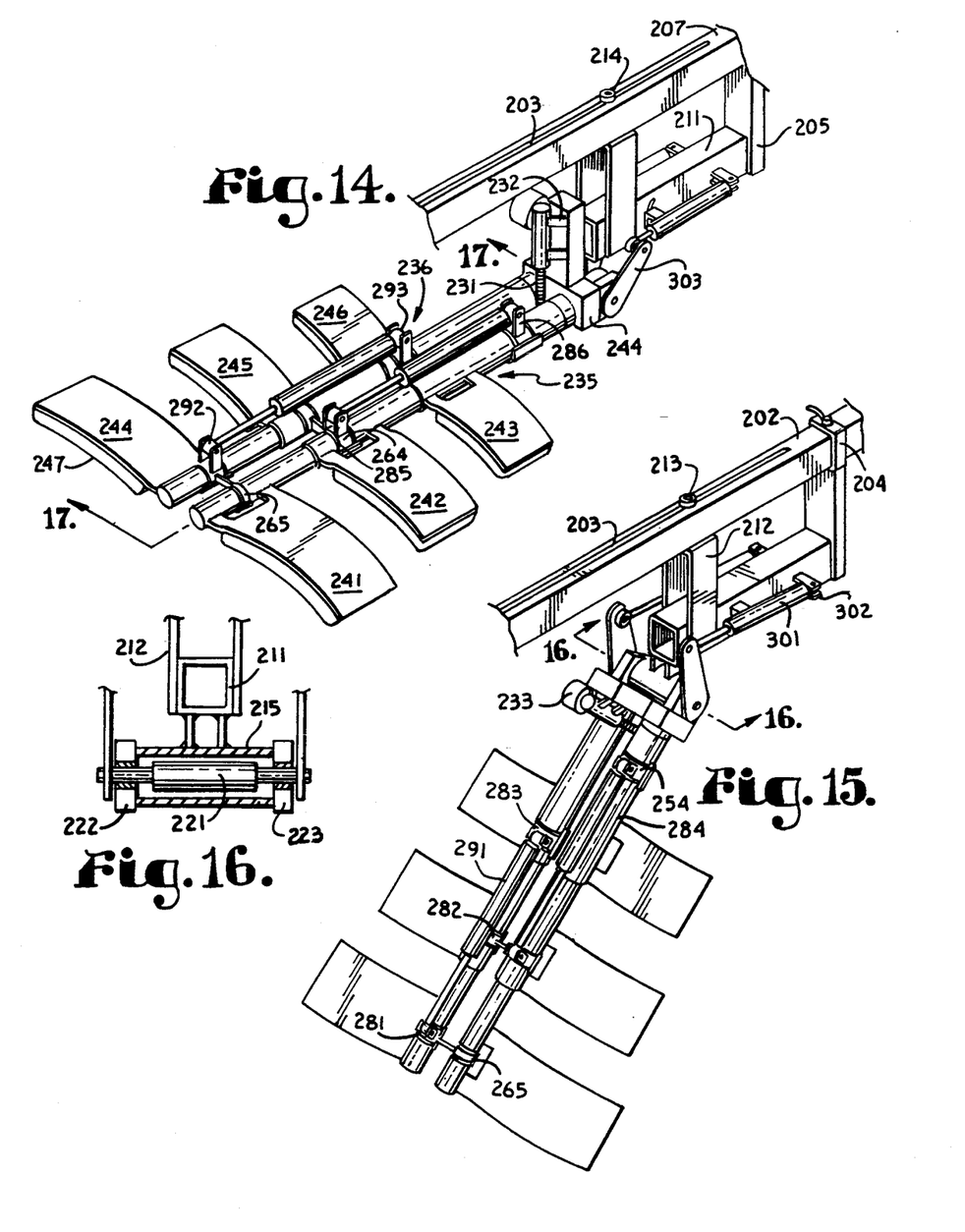
FIG. 14 is a perspective view of the neck restraint assembly with a pair of flap assemblies rotated open and pivoted to a horizontal position.
FIG. 15 is a perspective view of the neck restraint assembly with the pair of flap assemblies rotated closed and pivoted to a neck engaging position.
FIG. 16 is a cross-sectional view of the neck restraint assembly, taken along line 16—16 of FIG. 15, and illustrating a pivoting structure for the flap assemblies.

Referring to FIGS. 14 and 15, a pair of hydraulic cylinders 301 are attached at one end to clevises 302 on the horizontal support 211. At the other end, the hydraulic cylinders are pivotally attached to one end of matching bell cranks 303 which are attached at the other end to opposite ends of the shaft 221. As the hydraulic cylinders 301 are simultaneously extended, the bell cranks 303 turn the shaft 221, thus pivoting the flap assemblies 235 and 236 downward, as shown in FIG. 15, to a proper position to engage the neck of a confined giraffe 76 (FIG. 13). Conversely, retraction of the cylinders 301 turn the shaft 221 in the opposite direction to pivot the flap assemblies 235 and 236 upward to the position shown in FIG. 14.

As an adjunct to the neck restraint assembly, FIGS. 4, 20 and 21 illustrate a neck support assembly 311, which includes a support bar 312 selectively positioned beneath the confined giraffe's neck. The support bar 312, which is preferably equipped with a pad 313 extending along its length, is attached at either end to respective telescoping support arms 314 and 315. The extendable portion of each support arm 314 and 315 includes bores 316 through which a pin 317 in the fixed arm portion is placed to hold them in a selected extension position. The support arms 314 and 315 are pivotally connected to a respective pair of collars 321 which are rotatable with respect to fixed collars 322 with attached plates 323 which are removably insertable in pockets 324 in the door 121. A pin 325 is insertable in the fixed collar 322 and the rotatable collar 321 to selectively hold the support assembly 311 in place.

Referring to FIG. 20, a number of pressure sensors 326 are inserted within the pad 313 to sense pressure placed on the pad by the giraffe's neck. The pressure sensors 326 generate a pressure dependent electrical current in a cable 327 which is connected to a switch 328. The switch 328 then controls the extension of hydraulic cylinders 301 in the neck restraint assembly 201. With this arrangement, when pressure exerted on the giraffe's neck from the assembly 201, as detected by the sensors 326, reaches a set limit, the hydraulic cylinders 301 are frozen in position, thus insuring that no damage occurs to the giraffe. By properly chosen pressure limits, the sensors 326 can also insure that the giraffe's air passages are not blocked, thus preventing asphyxiation of the confined giraffe.

VI. Operation

The operation of the giraffe handling chute will now be described further with reference to FIGS. 1-23. Typically the chute will be positioned at an entrance or exit to quarters that giraffes 76 regularly occupy, so that each time the animals enter of exit the quarters, they must walk through the confinement structure 1. Thus the normally skittish animals become accustomed to walking through the confinement structure 1. Then, when some type of veterinary procedure needs to be performed on a giraffe, the gates 121 are closed while the giraffe 76 is in the confinement structure. The jackscrew 75 is then turned by hand to draw the movable wall system 3 toward the fixed wall system 2 to adjust the width of the confinement structure 1. Once the width is so adjusted, the panels 53 are removed and the leg restraints 71 pivoted inward as the gates 121 are drawn toward each other via the motorized lead screws 142. The torso flaps 151 are then raised to a supporting position via handles 163 and locked in place via pins 164 as the inflatable pads 174 are placed on them. The giraffe 76 is thus tightly wedged into position within the confinement structure 1 and supported via the torso flaps 151. This confinement and support is sufficient for many veterinarian and health maintenance operations, with access provided to the animal via removable kick panels 53 and doors 52.

However, should the giraffe 76 need to be sedated and/or rotated to allow access to its feet and lower body portions, the neck support assembly is placed onto the gate 121 which the giraffe 76 is facing and extended to provide adequate neck support (FIG. 4). Next the topmost portion of the confinement structure 2 is extended via the cylinders 181 and the neck restraint assembly 201 lowered and rotated to the neck supporting position shown in FIG. 13. The pressure sensors 326, acting in conjunction with switch 327 insure that the neck restraint assembly 201 is stopped prior to any injury to the giraffe 76. Once the giraffe 76 is secured, as shown in FIG. 22, the confinement structure 1 is elevated by extending the cylinders 101. Next, as shown in FIG. 23, the rotation cylinders 113 are extended, rotating the confinement structure 1 and giraffe 76 to a desired position.

Thus, the instant invention provides a safe and secure structure for handling giraffes while minimizing the ever present threat of neck and leg injury to these exotic animals. It should be noted that manual motion generating devices, such as flap handles 163, leg restraint handles 72, and jackscrews 75 can be replaced by hydraulic or other mechanically assisted devices. While the inventive apparatus has been shown and described as for use with giraffes, it should be apparent that it could also be used for other exotic hoofed stock, such as gnus, deer, zebras, etc., with little or no modification.

It is to be understood that while certain forms of the present invention have been illustrated and described herein, it is not to be limited to the specific forms or arrangement of parts described and shown.

What is claimed and desired to be secured by Letters Patent is as follows:

1. An animal handling chute comprising:
   (a) a support assembly;
   (b) a frame;
   (c) a fixed wall assembly connected to said frame;
   (d) attachment means for attaching said fixed wall assembly to said support assembly;
   (e) a movable wall assembly connected to and movable with respect to said frame;
   (f) means for selectively moving said movable wall assembly toward and away from said fixed wall assembly along said frame such that a confining space is provided between said fixed and said movable wall assembly; and
   (g) said attachment means comprises elevating means for selectively, linearly raising and lowering said fixed wall assembly, said movable wall assembly and said frame in a vertical plane with respect to said support assembly.

2. An invention as in claim 1, wherein said frame comprises:
   (a) a pair of transverse bottom frame members and a pair of transverse top frame members; and
   (b) said movable wall assembly includes a respective sleeve slidable with respect to each of said bottom and top transverse frame members.

3. An invention as in claim 1, wherein said movable wall assembly further comprises:
   (a) a plurality of removable kick panels for providing access to an animal confined within said chute.

4. An invention as in claim 1, wherein said movable wall assembly further comprises:
   (a) at least one leg restraint which is pivotable from a first position in which it is generally parallel with said movable wall assembly and outside of said confining space to a second position in which it is generally perpendicular to said movable wall assembly and partially inside said confining space.

5. An invention as in claim 1, and further comprising:
   (a) at least one gate positioned between respective ends of said movable and fixed wall assemblies, said at least one gate being telescoping to accommodate varying widths of said confining space.

6. An invention as in claim 1, wherein:
   (a) said elevating means comprises a pair of hydraulic cylinders connected between said fixed wall assembly and said support assembly.

7. An invention as in claim 1, wherein said fixed wall assembly is pivotally attached to said elevating means, and further comprising:
   (a) rotation means for rotating said fixed wall assembly, said frame and said movable wall assembly, along with a confined animal, relative to said support assembly between a generally vertical and a generally horizontal position.

8. An invention as in claim 7, wherein:
   (a) said rotation means comprises a pair of hydraulic cylinders connected between said elevating means and said fixed wall assembly.

9. An invention as in claim 1, and further comprising:
   (a) at least one torso support flap attached to said fixed wall assembly and being pivotable between a lowered position and an approximately horizontal position in which said at least one torso support flap is operative to support the torso of a confined animal.

10. An invention as in claim 1, wherein:
    (a) said fixed wall assembly, said movable wall assembly and said frame each have extendable top portions such that the topmost portion of said chute can be extended vertically upward.

11. An invention as in claim 10, and further comprising:
    (a) a neck restraint assembly attached to said topmost portion of said chute.

12. A giraffe handling chute comprising:
    (a) an adjustable confinement chute for securely confining a giraffe; and
    (b) an adjustable neck restraint assembly attached to an upper portion of said chute, said neck restraint assembly including at least one flap assembly including at least one neck engageable flap and rotation means for rotating said at least one flap assembly between a flap retracted position and a flap neck engaging position.

13. An invention as in claim 12, wherein:
    (a) said neck restraint assembly comprises a pair of said rotatable flap assemblies, each of which includes at least one neck engaging flap; and
    (b) said rotation means rotates both of said flap assemblies between said flap retracted position and said flap neck engaging position.

14. An invention as in claim 13, and further comprising:
    (a) pivoting means for pivoting said flap assemblies between said raised and lowered positions.

15. An invention as in claim 12, wherein said at least one flap assembly is pivotable between a raised position in which it is substantially horizontal and a lowered position in which it is at an angle approximating the neck angle of a confined giraffe.

16. An invention as in claim 12, wherein:
    (a) said neck restraint assembly is rotatably attached to an upper portion of said confinement chute and is adjustable longitudinally with respect to said chute such that it can be used to restrain a confined animal's neck at either end of said chute.

17. An invention as in claim 12, and further comprising:

(a) at least one gate positioned at a corresponding end of said chute; and
(b) a neck support assembly removably attached to said at least one gate.

18. An invention as in claim 17, wherein:
(a) said neck support assembly is adjustable in length to accommodate varying giraffe sizes.

19. An invention as in claim 17, wherein:
(a) said neck support assembly includes a pressure sensing means for sensing pressure exerted by a giraffe's neck thereon; and
(b) switch means connected to said pressure sensing means, said switch means controlling said neck restraint assembly in response to said sensed pressure.

20. A giraffe handling chute comprising:
(a) a confinement chute for securely confining a giraffe within an adjustable confining space;
(b) a torso flap means connected to said confinement means, said flap means including at least one flap which is selectively pivotable between a retracted position in which it is generally parallel to the side of the confined giraffe and a support position in which it is generally perpendicular to the giraffe's side and positioned beneath a portion of the giraffe's body; and at least one leg restraint which is pivotable from a first position in which it is generally parallel with a side wall of said chute to a second position in which it is generally perpendicular to said side wall and extends into said confining space.

21. An invention as in claim 20, wherein:
(a) said flap means includes a plurality of said flaps; and
(b) each of said flaps includes a telescoping extension member which can be retracted into the corresponding flap when said flap is in the retracted position and extended outward from said flap when said corresponding flap is in the support position.

22. An invention as in claim 20, wherein each said at least one leg restraint comprises:
(a) a pair of leg supports, each of which is pivotable between said first and second positions; and
(b) a handle for pivoting said leg supports.

23. An invention as in claim 20, wherein:
(a) each said at least one leg restraint is adjustable longitudinally along said chute wall.

24. An animal handling chute comprising:
(a) a support assembly;
(b) a frame;
(c) a fixed wall assembly connected to said frame;
(d) attachment means for attaching said fixed wall assembly to said support assembly;
(e) a movable wall assembly connected to and movable with respect to said frame, said movable wall assembly comprising at least one leg restraint which is pivotable from a first position in which it is generally parallel with said movable wall assembly and outside of said confining space to a second position in which it is generally perpendicular to said movable wall assembly and partially inside said confining space; and
(f) means for selectively moving said movable wall assembly toward and away from said fixed wall assembly along said frame such that a confining space is provided between said fixed and said movable wall assembly.

25. An invention as in claim 24, wherein each said at least one leg restraint comprises:
(a) a pair of leg supports, each of which is pivotable between said first and second positions; and
(b) a handle for pivoting said leg supports.

26. An invention as in claim 24, wherein:
(a) each said at least one leg restrains is adjustable longitudinally along said movable wall assembly.

27. An animal handling chute comprising:
(a) a support assembly;
(b) a frame;
(c) a fixed wall assembly connected to said frame;
(d) attachment means for attaching said fixed wall assembly to said support assembly;
(e) a movable wall assembly connected to and movable with respect to said frame;
(f) means for selectively moving said movable wall assembly toward and away from said fixed wall assembly along said frame such that a confining space is provided between said fixed and said movable wall assembly; and
(g) at least one gate positioned between respective ends of said movable and fixed wall assemblies, said at least one gate being telescoping to accommodate varying widths of said confining space.

28. An invention as in claim 27, wherein:
(a) each said at least one gate includes means for adjusting said at least one gate longitudinally relative to said fixed and movable wall assemblies to adjust the length of said confining space to accommodate varying animal sizes.

29. An invention as in claim 28, wherein:
(a) said means for adjusting comprises a motorized lead screw.

30. An invention as in claim 27, wherein each said at least one gate is pivotably attached to said fixed wall assembly and wherein:
(a) each said at least gate includes means for opening and closing said gate.

31. An invention as in claim 30, wherein:
(a) said means for opening and closing comprises a hydraulic cylinder and bell crank.

32. An animal handling chute comprising:
(a) a support assembly;
(b) a frame;
(c) a fixed wall assembly connected to said frame;
(d) attachment means for attaching said fixed wall assembly to said support assembly;
(e) a movable wall assembly connected to and movable with respect to said frame;
(f) means for selectively moving said movable wall assembly toward and away from said fixed wall assembly along said frame such that a confining space is provided between said fixed and said movable wall assembly; and
(g) at least one torso support flap attached to said fixed wall assembly and being pivotable between a lowered position and an approximately horizontal position in which said at least one torso support flap is operative to support the torso of a confined animal.

33. An invention as in claim 32, and further comprising:
(a) inflatable pad means positionable on said at least one torso support flap in said horizontal position.

34. An invention as in claim 32, wherein:

(a) said at least one torso support flap is extendable and retractable to accommodate for different widths of said confining space.

35. An animal handling chute comprising:
   (a) a support assembly;
   (b) a frame;
   (c) a fixed wall assembly connected to said frame;
   (d) attachment means for attaching said fixed wall assembly to said support assembly;
   (e) a movable wall assembly connected to and movable with respect to said frame;
   (f) means for selectively moving said movable wall assembly toward and away from said fixed wall assembly along said frame such that a confining space is provided between said fixed and said movable wall assembly, said fixed wall assembly, said movable wall assembly and said frame each having extendable top portions such that the topmost portion of said chute can be extended vertically upward; and
   (g) a neck restraint assembly attached to said topmost portion of said chute.

36. An invention as in claim 35, wherein:
   (a) said neck restraint assembly comprises a pair of rotatable flap assemblies, each of which includes at least one neck engaging flap; and
   (b) rotation means for rotating both of said flap assemblies between a flap retracted position and a flap neck engaging position.

37. An invention as in claim 36, wherein said pair of flap assemblies are pivotable between a raised position in which they are substantially horizontal and a lowered position in which they are at an angle approximating the neck angle of a confined animal.

38. An invention as in claim 37, and further comprising:
   (a) pivoting means for pivoting said flap assemblies between said raised and lowered positions.

39. An invention as in claim 35, wherein:
   (a) said neck restraint assembly is rotatably attached to said topmost portion of said chute and is adjustable longitudinally with respect to said chute such that it can be used to restrain a confined animal's neck at either end of said chute.

40. An invention as in claim 39, said neck restraint assembly further comprising:
   (a) a pivotable C clamp which is removably attachable to a structural member on said topmost chute portion.

41. An invention as in claim 35, and further comprising:
   (a) at least one gate positioned at a corresponding end of said chute; and
   (b) a neck support assembly removably attached to said at least one gate.

42. An invention as in claim 41, wherein:
   (a) said neck support assembly is adjustable in length to accommodate varying animal sizes.

43. An invention as in claim 41, wherein:
   (a) said neck support assembly includes pressure sensing means for sensing pressure exerted by an animal's neck thereon; and
   (b) switch means connected to said pressure sensing means, said switch means controlling said neck restraint assembly in response to said sensed pressure.

44. An animal handling chute comprising:
   (a) a support assembly;
   (b) a frame;
   (c) a fixed wall assembly connected to said frame;
   (d) attachment means for attaching said fixed wall assembly to said support assembly;
   (e) a movable wall assembly connected to and movable with respect to said frame;
   (f) means for selectively moving said movable wall assembly toward and away from said fixed wall assembly along said frame such that a confining space is provided between said fixed and said movable wall assembly;
   (g) at least one gate positioned at a corresponding end of said chute;
   (h) a neck support assembly removably attached to said at least one gate, said neck support assembly including pressure sensing means for sensing pressure exerted by an animal's neck thereon;
   (i) a neck restraint assembly rotatably attached to a topmost portion of said chute; and
   (j) switch means connected to said pressure sensing means, said switch means controlling said neck restraint assembly in response to said sensed pressure.

* * * * *